Nov. 9, 1926.  1,606,690
G. T. BOUTON
BEARING FOR PROPELLER SHAFTS FOR MOTOR VEHICLES
Filed Jan. 3, 1925
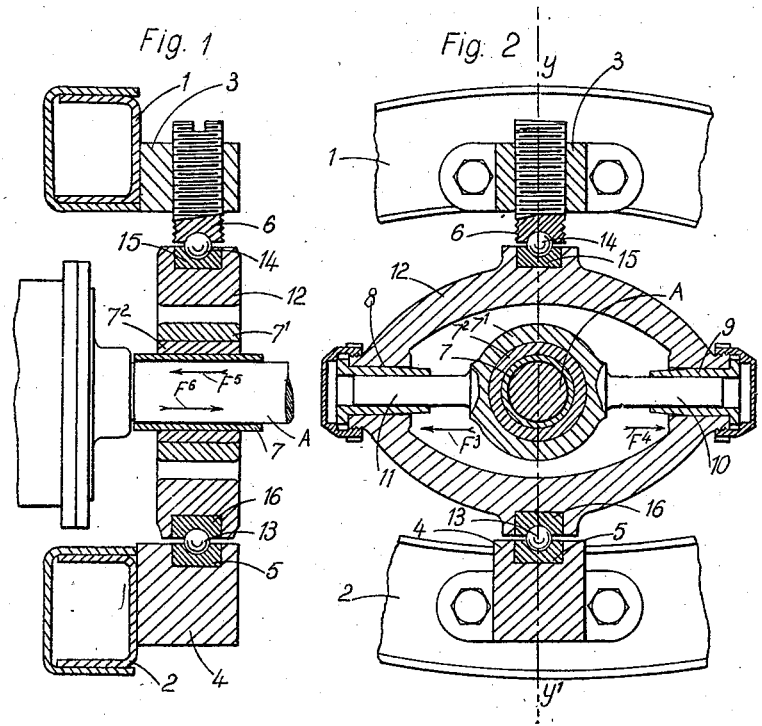
Inventor
G.T. Bouton
By Marks & Clerk
Attys.

Patented Nov. 9, 1926.

1,606,690

UNITED STATES PATENT OFFICE.

GEORGES THADÉE BOUTON, OF PUTEAUX, FRANCE, ASSIGNOR TO ETABLISSEMENTS DE DION BOUTON, SOCIÉTÉ ANONYME, OF PUTEAUX, FRANCE, A CORPORATION OF FRANCE.

BEARING FOR PROPELLER SHAFTS FOR MOTOR VEHICLES.

Application filed January 3, 1925, Serial No. 368, and in France January 15, 1924.

This invention relates to improvements in motor vehicles and particularly to novel means for connecting the propeller shaft to the chassis of the vehicle.

The primary object of the invention is to provide means to support the propeller shaft from the chassis in such manner that the shaft may move relatively to the chassis in various directions without injury to either the shaft or chassis.

With the foregoing object outlined and with other objects in view which will appear as the description proceeds, the invention consists in the novel features hereinafter described in detail, illustrated in the accompanying drawing and more particularly pointed out in the appended claims.

Referring to the drawing:

Figure 1 is a vertical longitudinal section of a portion of the propeller shaft and chassis and the means connecting the shaft and chassis.

Fig. 2 is a transverse vertical sectional view of the same.

In the drawing, 1 and 2 designate chassis cross bars of special shape which carry brackets 3 and 4 supporting respectively a screw 6 and a bearing member 5 which form seats for anti-friction balls 13 and 14. These balls are also seated in bearing members 15 and 16 arranged at the top and bottom of a housing 12. The screw 6 may be adjusted to regulate the pressure on the balls.

A propeller shaft A connects the engine and rear wheels (not shown) and in the present construction the shaft may slide axially in the sleeve 7 in opposite directions as indicated by the arrows $F^5$ and $F^6$. Of course the shaft may also turn in the sleeve 7. This sleeve is secured in a bearing 7' having a bushing $7^2$.

The bearing has oppositely extending transverse studs 10 and 11 which may slide or rotate in sleeves 8 and 9 carried by the housing 12.

Due to this construction the shaft may move axially in the directions of the arrows $F^5$—$F^6$ relativlely to the chassis or the chassis may move in the same directions relatively to the shaft. Furthermore, the shaft may oscillate in a vertical plane extending along the axis of the shaft, as the studs 10 may rock in the sleeves 8 and 9. Also the shaft may reciprocate from side to side in the direction of the arrows $F^3$ or $F^4$ as the studs 10 and 11 may move axially in the sleeves 8 and 9. In addition the shaft may rock transversely in a horizontal direction about the axis $y$—$y'$ as the housing 12 is mounted on the balls 13 and 14.

From the foregoing it is believed that the construction, operation and advantages of the invention may be readily understood and it is apparent that changes may be made in the details disclosed without departing from the spirit of the invention as expressed in the claims.

What I claim and desire to secure by Letters Patent is:—

1. A device for connecting the propeller shaft to the chassis of a motor vehicle including supporting brackets, a housing encircling the shaft and pivotally connected to said brackets for movement about a vertical axis, a bearing mounted in the housing and movable about a transverse horizontal axis and also movable laterally in opposite directions, and a sleeve arranged in the bearing and surrounding the propeller shaft, the propeller shaft being slidable axially within said sleeve.

2. A device for connecting the propeller shaft to the chassis of a motor vehicle including supporting brackets carried by the chassis, a housing surrounding the shaft, anti-friction pivots arranged between said brackets and said housing to permit the housing to move about a vertical axis which intersects the shaft, oppositely disposed sleeves carried by the housing, said sleeves being coaxial, a bearing surrounding the shaft and having oppositely extending pins slidably and rotatably mounted in the sleeves, another sleeve carried by the bearing and loosely fitting on the shaft to permit the latter to move axially therein.

In testimony whereof I hereunto affix my signature.

GEORGES THADÉE BOUTON.